(No Model.) 6 Sheets—Sheet 1.
J. N. KEMMERER.
STEAM ENGINE.

No. 473,844. Patented Apr. 26, 1892.

WITNESSES: Fred G. Dieterich, P. B. Turpin.

INVENTOR: John N. Kemmerer.
BY [signature]
ATTORNEYS (No Model.) 6 Sheets—Sheet 2.

J. N. KEMMERER.
STEAM ENGINE.

No. 473,844. Patented Apr. 26, 1892.

WITNESSES:
Fred G. Dieterich
P. B. Turpin

INVENTOR:
John N. Kemmerer.
BY Munn & Co
ATTORNEYS (No Model.) 6 Sheets—Sheet 3.
J. N. KEMMERER.
STEAM ENGINE.
No. 473,844. Patented Apr. 26, 1892.
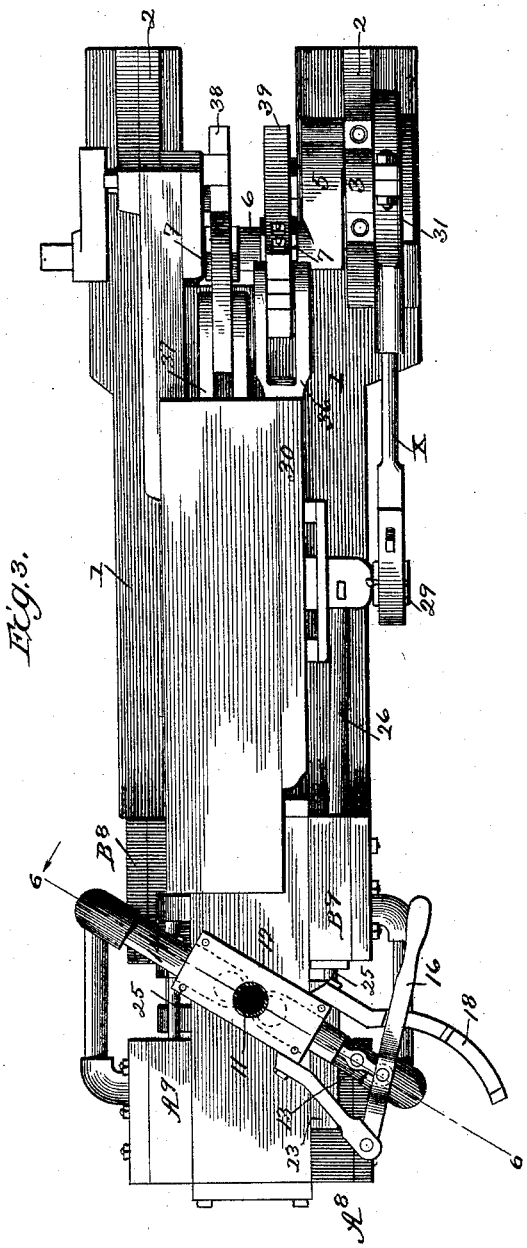
Fig. 3.
WITNESSES:
Fred G. Dieterich
P. B. Turpin.
INVENTOR:
John N. Kemmerer.
BY 
ATTORNEYS (No Model.) 6 Sheets—Sheet 4.
J. N. KEMMERER.
STEAM ENGINE.
No. 473,844. Patented Apr. 26, 1892.
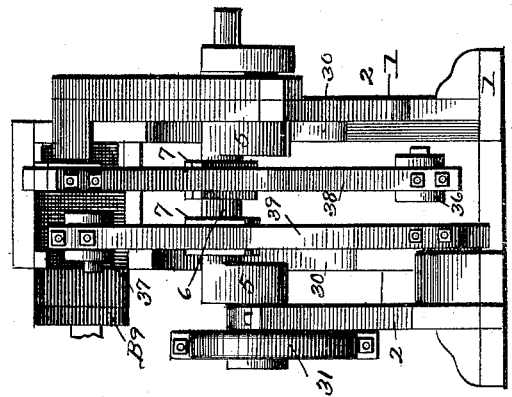
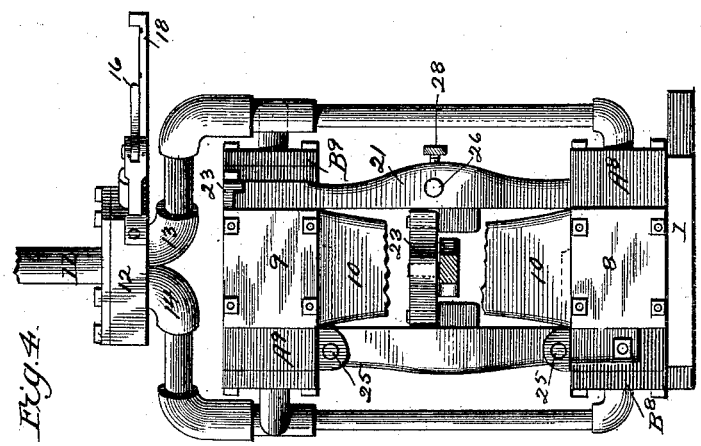
WITNESSES:
Fred J. Dieterich
P. B. Turpin
INVENTOR:
John N. Kemmerer
BY
ATTORNEYS.
THE NORRIS PETERS CO., PHOTO-LITHO., WASHINGTON, D. C.

(No Model.) 6 Sheets—Sheet 5.
J. N. KEMMERER.
STEAM ENGINE.
No. 473,844. Patented Apr. 26, 1892.
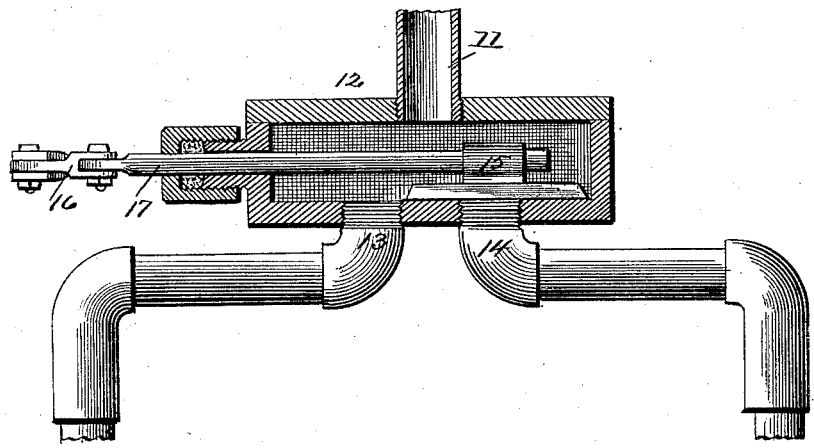
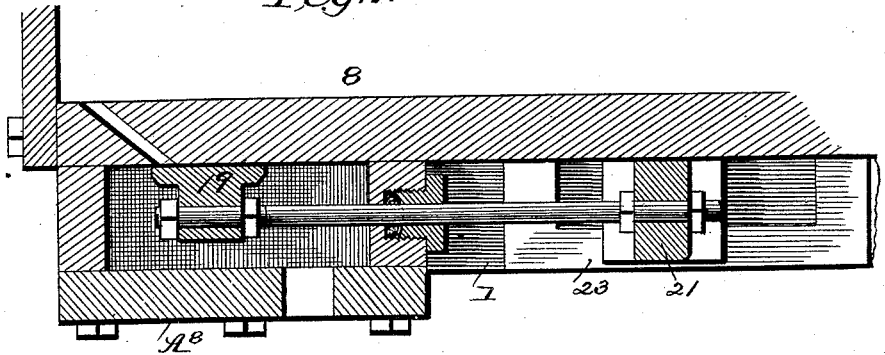

(No Model.)  6 Sheets—Sheet 6.

J. N. KEMMERER.
STEAM ENGINE.

No. 473,844. Patented Apr. 26, 1892.

WITNESSES:
Fred G. Dieterich
P. B. Turpin.

INVENTOR:
John N. Kemmerer.

BY
ATTORNEYS

UNITED STATES PATENT OFFICE.

JOHN N. KEMMERER, OF LOGANTON, PENNSYLVANIA, ASSIGNOR OF THREE-FIFTHS TO JOHN K. HECKMAN, WILLIAM R. GOODMAN, AND JOSEPH KEMMERER.

STEAM-ENGINE.

SPECIFICATION forming part of Letters Patent No. 473,844, dated April 26, 1892.

Application filed July 8, 1891. Serial No. 398,858. (No model.)

*To all whom it may concern:*

Be it known that I, JOHN N. KEMMERER, of Loganton, in the county of Clinton and State of Pennsylvania, have invented a certain new and useful Improvement in Steam-Engines, of which the following is a specification.

This invention is an improvement in steam-engines, and seeks, among other improvements, to provide simple and novel mechanism whereby the power may be so applied to the crank-shaft as to overcome or avoid dead-centers and at the same time secure an increase of power; to provide improved throttle devices for use in connection with several steam-cylinders and steam-channels leading to the opposite ends thereof, so that steam may be admitted to the inner end of one cylinder and the outer end of the other, and vice versa; to provide improvements in the valve-gear for operating and controlling the valves of the different cylinders, and to provide other improvements, as will be hereinafter described.

The invention consists in certain features of construction and novel combinations of parts, as will be hereinafter described, and pointed out in the claims.

Figure 1:
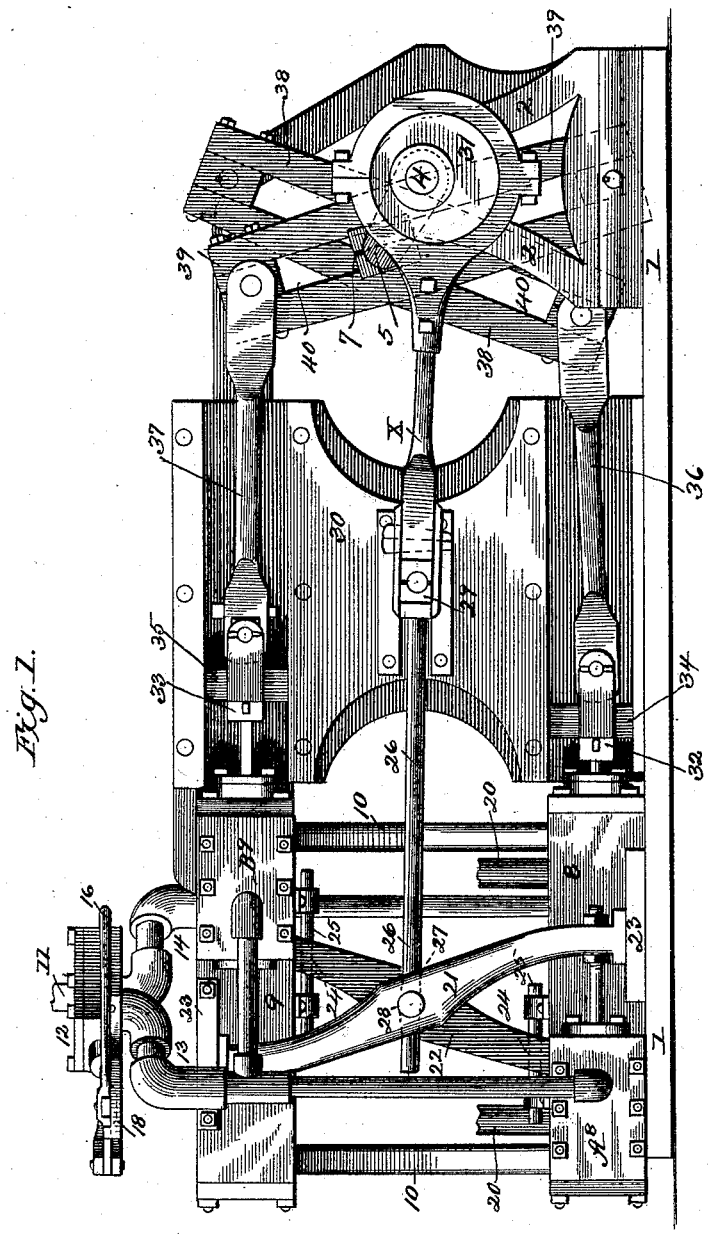
Figure 2:
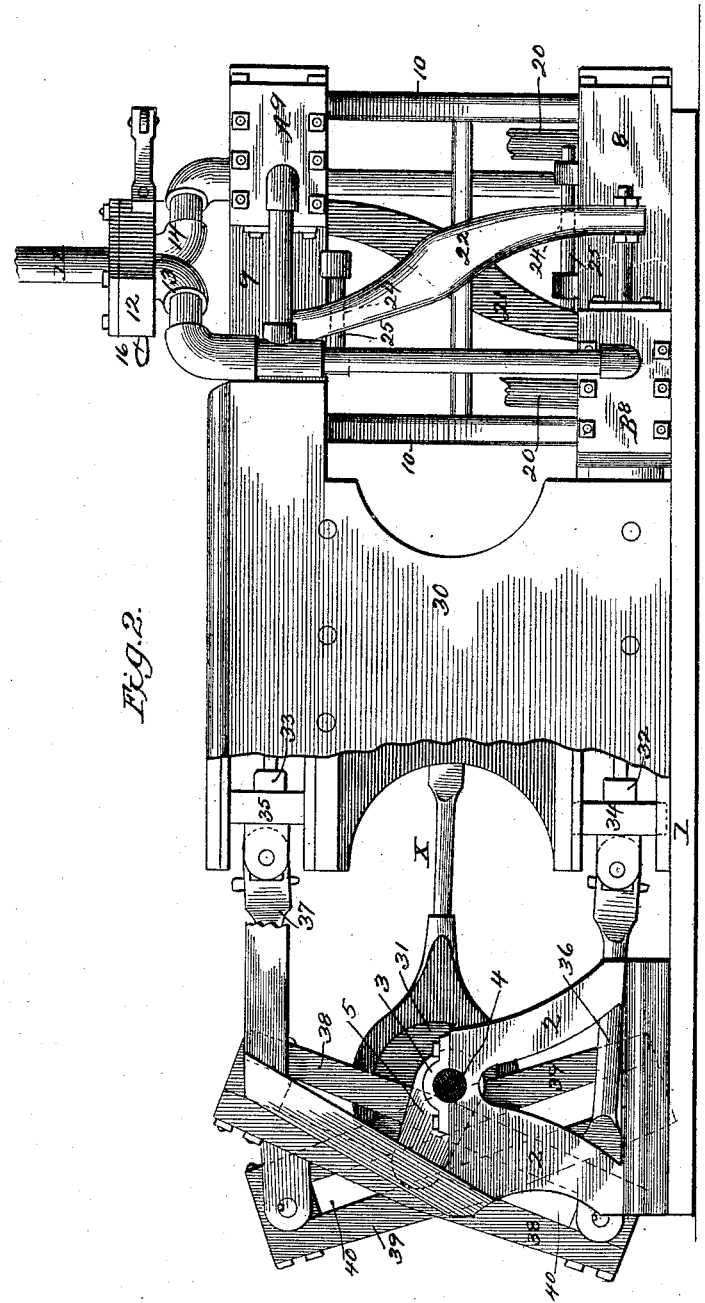
Figure 8:
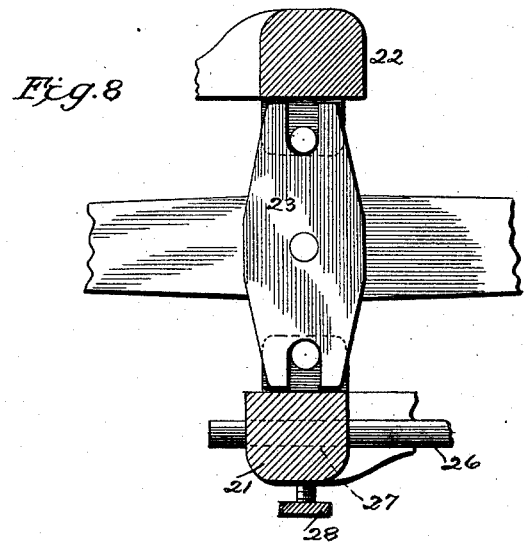
Figure 9:
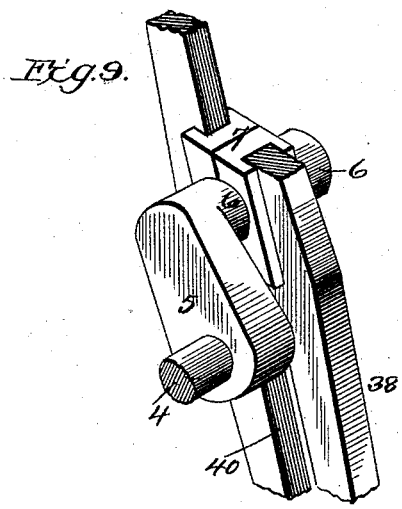

In the drawings, Figure 1 is a side elevation of the face of the engine. Fig. 2 is an elevation of the opposite side of the engine. Fig. 3 is a top plan view of the engine. Fig. 4 is an elevation of the cylinder end of the engine. Fig. 5 is an elevation of the crank-shaft end of the engine. Fig. 6 is a vertical section on about line 6 6 of Fig. 3 through the throttle-valve and its chest. Fig. 7 is a detail sectional view of one of the cylinder-chests and its valve. Fig. 8 is a detail sectional view above and looking down on the lever which yokes together the valve-stem slide-bars. Fig. 9 is a detail view illustrating the manner of connecting the levers with the shaft-crank.

The framing shown comprises a base-plate 1, provided at one end with stands 2, having bearings 3 for the shaft 4, the crank 5 of which preferably has its wrist 6 provided with the journaled blocks 7, on which the levers presently described fit and slide. At its other or front end the bed-plate supports the cylinders 8 and 9, which are preferably arranged one above the other and braced firmly together by the upright beams 10 10. While this arrangement is preferred and while for convenience of reference I shall refer to the cylinders 8 and 9 as the "lower" and "upper" cylinders, it is obvious that I do not desire or intend to be limited to such specific arrangement, as a variation therefrom would involve no departure from the broad principles of my invention.

The cylinders 8 and 9 have each two steam-chests, those of the lower cylinder being designated $A^8$ and $B^8$ and those of the upper cylinder $A^9$ and $B^9$, the chests $A^8$ $A^9$ being arranged at the front ends of their respective cylinders and the chests $B^8$ $B^9$ at the rear or inner ends thereof, as will be seen from the drawings. The steam-pipe 11 leads to the throttle-valve chest 12, which has two outlet-ports connecting with the pipes or channels 13 and 14, and the throttle-valve 15 operates in said chest 12 and may be adjusted to open either the outlet-port to pipes 13 and 14 or to close both such outlets. By throwing the steam through pipes 13 or 14 the engine may be driven in one or the other direction. The throttle-valve is movable longitudinally in the chest over the ports to pipes 13 or 14 and is sufficiently long to fit over and close both such ports or to be adjusted to open either one and close the other, as may be desired. This will be readily understood from Fig. 6. The throttle-lever 16 is connected by rod 17 with the valve 15 and engages the rack 18, having notches by which the lever may be held in intermediate position to close both ports 13 and 14, or in either its outer or inner position to open either of such ports, as desired. Thus by the same lever the throttle-valve may be operated to start or stop the engine and to cause the same to run in either direction, and when running to reverse its motion. The pipe 13 has branches leading to the steam-chests $A^8$ and $B^9$ and the pipe 14 has branches leading to the chests $B^8$ and $A^9$. Thus it will be seen that steam may be admitted by pipe 13 to the front end of chest 8 and the rear end of cylinder 9, or by pipe 14 to the front end of chest 9 and the rear end of cylinder 8. By this means it will be seen that steam may be admitted on one side of the piston in cylinder 8 and on the opposite side of the piston in cylinder 9, so that the piston in one cylinder is forcibly operated in one direction and that in the other cylinder in the opposite direction, as will be understood.

The valves 19 in the several steam-chests are alike, and, as shown in Fig. 7, are constructed to admit steam to the cylinder and to permit the escape at proper time of exhaust therefrom, the exhaust passing off through pipe 20. The front valve of the lower cylinder and the rear valve of the upper cylinder are connected by a bar 21, and the front valve of the upper cylinder is connected with the rear valve of the lower cylinder by a bar 22, and the bars 21 22 are connected by a rocking lever 23, which is pivoted centrally to a suitable support and connects at its opposite ends with the bars 21 22, as shown in Fig. 8, so that the said bars 21 22 move alternately, one forward and the other back, and vice versa. The bar 21 is held at its upper and lower ends in guides 23, so that it may move bodily back and forth, while the bar 22 is perforated at 24 to receive guide-rods 25, so that the bar 22 is steadied firmly in its backward and forward movement. The bar 21 is further steadied by its connection with its operating-rod 26, which passes through an opening 27 in the said bar and is adjustably secured thereto by a screw 28. Said rod 26 connects with a cross-head 29, supported in guides on the side of the intermediate frame 30, and such cross-head is also connected by rod X with the strap of eccentric 31 on the shaft 4, so that such shaft operates through the intermediate connections described to properly operate the valves. The piston-rods 32 33 of the lower and upper pistons connect with cross-heads 34 35 in the framing, and such cross-heads connect by pitmen 36 37 with the levers 38 39. The lever 38 is pivoted at one end to the framing above the shaft 4, connects intermediate its ends by a sliding connection with the crank-wrists 6, and is connected at its lower or free end with the pitmen 36, by which the lever is rocked. The lever 39 is similar to lever 38, but is pivoted at its lower end to the framing, connects intermediate its ends by a sliding connection with the crank-wrist, and is connected at its upper end with the pitman 39, by which it is rocked.

In effecting the sliding connection of the levers with the crank-wrist it is preferred to slot the levers longitudinally at 40 and fit in said slots the blocks 7, which are journaled to rock on the crank-wrist and to slide in the slots of the levers. Manifestly the blocks may be omitted, or the levers might be arranged to slide through the blocks instead of the blocks sliding in the levers; but I prefer the construction shown and before described.

In operation the valves are so arranged that while the upper and lower cross-heads move forward and back at almost the same time one moves slightly in rear of the other, so that just before the steam in one cylinder exhausts the other cylinder will take steam. Thus it will be seen from Fig. 1 that the upper piston-rod is almost at the end of its stroke, or nearly at dead-center, but before the steam in the upper cylinder exhausts the lower cylinder will take steam. This will be readily seen in Fig. 1, and in Fig. 2 it will be seen that just before the lower cylinder-piston finishes its stroke the upper cylinder will take steam.

It will be understood that by the described construction I not only avoid dead-centers, but I secure the increase of power resulting from the leverage in applying the power of the engine to the crank-shaft.

Having now described my invention, what I claim is—

1. In an engine, the combination, with the shaft and its crank, of levers arranged side by side and having a sliding connection between their ends with said crank, one of said levers being pivotally secured at one side of the shaft and the other lever being pivotally secured at the opposite side of the shaft, and operating devices whereby to rock the said levers, substantially as set forth.

2. In an engine, the combination of the shaft and its crank, the slotted levers arranged parallel and having a sliding connection with the crank, one of said levers being pivotally secured at its upper end and the other at its lower end, and the two cylinders whose pistons are connected with the free ends of such levers, all being arranged to operate substantially as and for the purposes set forth.

3. In an engine, the combination, with the shaft and its crank, of the levers arranged side by side and connected with said crank, the steam-cylinders, the piston-rods connected with the said levers, the steam-inlet valves to said cylinder, and devices controlling the same, all arranged and adapted to operate substantially as described, whereby steam is admitted to each cylinder just prior to the end of the stroke of the piston in the other cylinder, all substantially as and for the purposes set forth.

4. An improved engine, substantially as described, provided with two cylinders, each having a steam-chest at both ends and valves therein and provided with steam pipes or channels, one of such pipes or channels having branches leading to the front chest of one cylinder and the rear chest of the other and the other pipe or channel having branches connecting the other two chests, and devices whereby steam may be admitted to either of said pipes or channels, all substantially as set forth.

5. In an engine, substantially as described, the combination of the steam-cylinders, chests at the opposite ends of each of said cylinders, valves in each of said chests, a bar connected with the front valve of one cylinder and the rear valve of the other cylinder, a bar connected with the other two valves, a connection between said bars whereby the movement of one may effect the movement of the other, and operating mechanism by which to move one of such bars, all substantially as set forth.

6. In an engine, the combination of the two cylinders, each having chests at both ends, the valves in such chests, the two bars connected with the said valves, substantially as described, and a lever connected at its opposite ends with said bars and pivoted between said ends, substantially as set forth.

7. In an engine, substantially as described, the combination of two cylinders, each having a steam-chest at its front and rear ends and steam pipes or channels, and controlling devices whereby steam may be supplied to the front chest of one of said cylinders and the rear chest of the other cylinder, all substantially as and for the purposes set forth.

8. In an engine, the combination of the cylinders having chests and valves at both ends, the bars connected with the front valve of one cylinder and the rear valve of the other, connections between said bars, a rod connected at one end to one of said bars, a cross-head to which the opposite end of such rod connects, a shaft having an eccentric, and a pitman connecting such eccentric with the cross-head, all substantially as set forth.

JOHN N. KEMMERER.

Witnesses:
P. B. TURPIN,
B. W. SCHWENK.